US008983208B2

(12) United States Patent
Jaffe et al.

(10) Patent No.: US 8,983,208 B2
(45) Date of Patent: Mar. 17, 2015

(54) PATTERN MATCHING BASED ON GLOBAL QUANTITATIVE CHARACTERIZATION OF PATTERNS

(75) Inventors: Charles Jaffe, Morgantown, WV (US); Alfred H. Stiller, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 2490 days.

(21) Appl. No.: 11/559,671

(22) Filed: Nov. 14, 2006

(65) Prior Publication Data
US 2008/0112623 A1  May 15, 2008

(51) Int. Cl.
*G06K 9/00* (2006.01)

(52) U.S. Cl.
CPC ........ *G06K 9/00067* (2013.01); *G06K 9/00087* (2013.01)
USPC .......................................... 382/224; 382/115

(58) Field of Classification Search
USPC .......................................... 382/382, 181, 185
See application file for complete search history.

(56) References Cited

U.S. PATENT DOCUMENTS

| 7,366,337 | B2 * | 4/2008 | Kortum et al. ................. 382/135 |
| 2004/0083062 | A1 | 4/2004 | Athelogou |
| 2005/0044344 | A1 | 2/2005 | Stevens |
| 2005/0251032 | A1 | 11/2005 | Smith |
| 2006/0200260 | A1 | 9/2006 | Hoffberg et al. |

OTHER PUBLICATIONS

Su et al: "Fingerprint classification based on fractal analysis", Signal Processing Proceedings, 2000. WCCC-ICSP 2000, 5th International Conference, vol. 3, Aug. 21-25, 2000 pp. 1471-1474 vol. 3.*
Lin et al: "Locating the eye in human face images using fractal dimensions", IEE Proc.-Vis. Image signal process, 2001.*
Arneodo et al: "characterizing long-range correction in DNA sequences from wavelet analysis", Physical Review Letters, American Physical Society, 1995.*
PCT Application Serial No. PCT/US07/83972 International Search Report mailed Jun. 18, 2008, 3 pages.
Vasconcelos, D.B. et al., "Spatial Recurrence Plots," Physical Review, vol. E 73, May 23, 2006, pp. 056207-1 to 056207-10.
Declaration of Dr. Charles Jaffe with Exhibits A-D, Jul. 21, 2008, 49 pages.
Declaration of Dr. Alfred Stiller with Exhibits A-D, Jul. 21, 2008, 49 pages.
Declaration of William Aylor with Exhibit A, Sep. 10, 2008, 20 pages.
PCT Application Serial No. PCT/US07/83972 International Search Report and Written Opinion mailed Jun. 18, 2008, 13 pages.

* cited by examiner

*Primary Examiner* — Ruiping Li
(74) *Attorney, Agent, or Firm* — Thomas | Horstemeyer, LLP.

(57) ABSTRACT

Various systems, methods, and programs embodied in computer-readable mediums are provided for detecting a match in patterns. In one embodiment, a method is provided that comprises performing a fractal analysis on a first pattern in a computer system to generate a first global quantitative characterization of the first pattern. The method further comprises comparing the first global quantitative characterization with a second global quantitative characterization associated with a second pattern in the computer system to determine whether the first pattern matches the second pattern. The second global quantitative characterization is generated from the second pattern.

23 Claims, 10 Drawing Sheets

0°   Rotated by 90°

PATTERN MATCHING BASED ON GLOBAL QUANTITATIVE CHARACTERIZATION OF PATTERNS

STATEMENT REGARDING FEDERALLY SPONSORED RESEARCH OR DEVELOPMENT

The U.S. government may have a paid-up license in this invention and the right in limited circumstances to require the patent owner to license others on reasonable terms as provided for by the terms of Award No. 2003-RC-CX-K001 awarded by the National Institute of Justice, the Department of Justice of the United States.

CROSS REFERENCE TO RELATED APPLICATIONS

This application is related to U.S. Patent Application entitled "GLOBAL QUANTITATIVE CHARACTERIZATION OF PATTERNS USING FRACTAL ANALYSIS" filed on even date herewith and assigned application Ser. No. 11/559,660, and U.S. Patent Application entitled "PATTERN DETECTION BASED ON FRACTAL ANALYSIS" filed on even date herewith and assigned application Ser. No. 11/559,683, both of these applications being incorporated herein by reference in their entirety.

BACKGROUND

The identification and matching of various patterns can be difficult and time intensive. For example, in the field of fingerprinting, the accuracy of the identification procedure relies on algorithms that perform direct feature comparisons. Once an algorithm has selected the "best candidates" then individual inspectors do a personal verification analysis before the fingerprint can be considered identified. In short, a direct comparison algorithm picks out "best candidates" and then the final selection is made through personal verification. Such algorithms are sensitive to position and variability in resolution between field data and file data. The time and data-processing infrastructure required for such identification is extensive as the operation is quite cumbersome. Also, the identification of patterns in contexts other than fingerprinting can be expensive and time consuming as well.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Given the difficulty in performing identification of patterns such as fingerprints as described above, disclosed are various embodiments of the present invention in which a quantitative characterization of patterns are generated. The quantitative characterizations may then be used for such purposes as pattern matching such as is the case in fingerprint identification or pattern matching in other contexts. Although the example of fingerprinting is discussed herein, the principles of the present invention are far more general than fingerprinting and may be applied in many different contexts. In this sense, any discussion herein relating to fingerprinting is mentioned herein solely to provide an example context to aid in the understanding of the various principles described. The principles described herein apply in other contexts, such as in connection with DNA analysis, face analysis, analysis of data transactions, and in the context of other fields.

In the discussion that follows, we first describe the generation of a quantitative characterization of a pattern such as fingerprints. Specifically, the quantitative characterization is a global quantitative characterization generated by generating one or more fractal images based upon the pattern as will be described. Thereafter, we describe various implementations of these principles in computer systems or other implementations.

Figure 1:
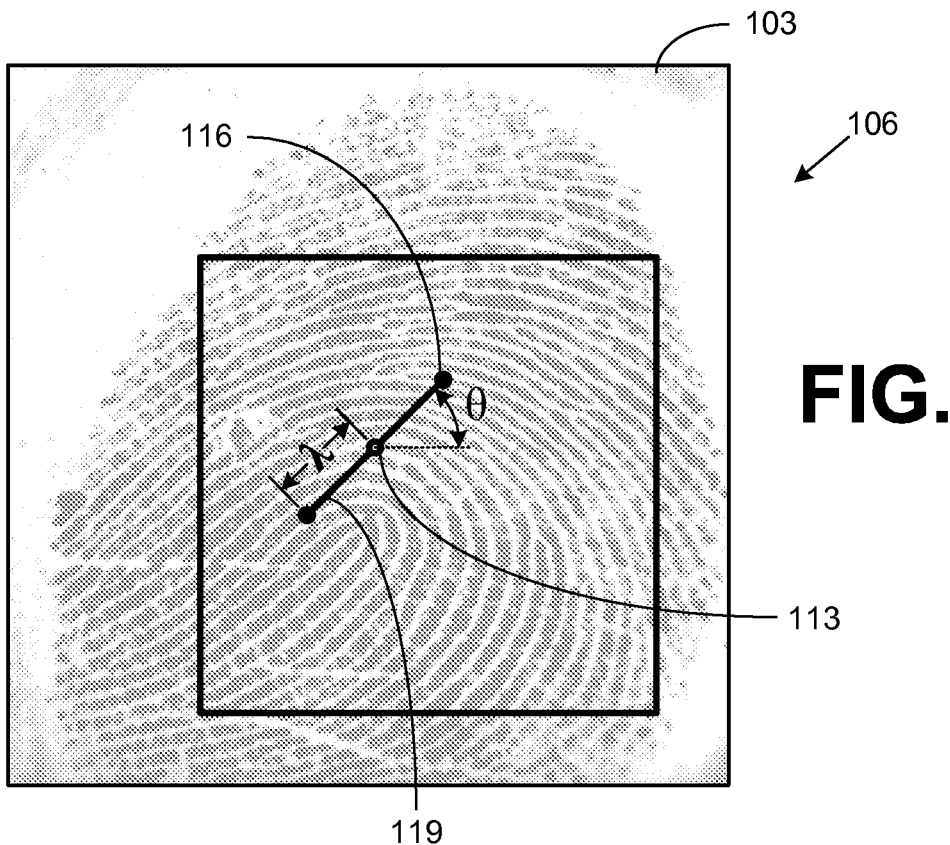
FIG. 1 is a drawing of a point in a random walk through an image in a process to generate a quantitative characterization of the image according to an embodiment of the present invention.

With reference to FIG. 1, shown is a drawing of a pattern 103 in the form of a fingerprint to illustrate the concept of a so called "random walk" 106 that is performed on the pattern 103 according to the various embodiments of the present invention. In particular, data is obtained from the pattern 103 from which a fractal may be constructed. In one embodiment, the fractal comprises, for example, a four sided shape such as a square, although fractals can be generated in the form of any other shape.

Assuming that a fractal is to be generated in the form of a square, then the random walk 106 generates a sequence of data sets, where each data set comprises four values. Each of the four values in the data sets is associated with a respective corner of a square in order to be able to play a chaos game as will be described. The random walk 106 can be said to generate an array of data sets that are four values deep or having four values per each consecutive integer of the array.

The random walk 106 is performed by selecting a random sequence of points within the image itself. To accommodate the random walk 106 through the image, a border may be imposed around the periphery of the image within which all random points are contained. Alternatively, a region within the pattern 103 may be specified by imposing an appropriate border within which the random walk 106 is performed. As illustrated in FIG. 1, a square region within a pattern 103 comprising a fingerprint is specified, although any region of any shape may be specified so long as the area it contains comprises the pattern 103 itself.

Next, a random sequence of points 113 is specified that fall within the pattern 103 or region specified within the pattern 103. For each of the points 113, a pair of data points 116 are specified. In the illustration of FIG. 1, point 113 bisects a segment 119, where the data points 116 are specified as the ends of the segment 119. The segment 119 is disposed at a random angle $\theta$ with respect to the horizontal. The length of the segment 119 is specified as $2\lambda$, where $\lambda$ is defined as the "scale" at which the random walk 106 is performed. The scale $\lambda$ also is associated with a respective fractal that is generated from the random walk 106.

The scale $\lambda$ may be varied to perform a series of random walks 106, where the scale is different for each random walk 106. This results in multiple fractals of different, corresponding scales as can be appreciated. The different fractals may then be used to generate a quantitative characterization of the pattern upon which the random walks 106 were performed as will be described.

To perform the random walk 106, first the scale $\lambda$ is specified. Next, a number of random points 113 are specified in the pattern 103, or region within the pattern 103. For each of the random points, a random angle $\theta$ is also specified. For each of the random points 113, given the random angle $\theta$ and the scale $\lambda$, the data points 116 are identified on either end of the segment 119.

Given that the pattern is composed of discrete black and white structures, each of the data points 116 falls upon a white or a black portion of the pattern 103. Thus, for each of the random points 113, the resulting pair of data points 116 may comprise one of four possible combinations of data values. In the context of a fingerprint, these combinations of data values comprises combinations of color values including white-white, white-black, black-white, and black-black. Once the data values are known for a given random point 113, they are stored in an array in a memory and the next random point 113 is identified until the random walk 106 is complete. It should be understood that other values beyond color values may also be obtained from respective pattern 103, depending upon the type of pattern 103 within which the random walk 106 is to be performed. For example, a random walk 106 may be performed through data other than an image such as, for example, DNA or financial transactions as will be described.

In various embodiments, the random walk 106 may include any number of random points 113 and can result in a sizable array of data values. For example, in various embodiments, a random walk 106 through a given pattern 103 may comprise hundreds of thousands or even millions of random points 113. In one embodiment, the number of random points 113 taken in a given random walk 106 is performed using a computer system as will be described. Thus, the number of random points 113 taken may be limited only by the available memory or computing capacity available to perform the random walk 106 given desired time and memory constraints.

Although the random walk 106 is described as specifying points in the pattern 103 at random, in other embodiment, the walk might not be random. In such an alternative, the points may be identified along a grid structure imposed over the pattern 103.

In addition, it may be necessary to precondition the pattern 103 so as to accommodate the random walk 106. For example, if the pattern 103 includes colors that are mixed rather than discrete black and white, for example, then the pattern 103 may need to be processed so as to include only discrete colors such as black and white. The processing may involve such techniques as those employed for the conversion of images from gray scale to black and white as are discussed, for example, by Watson, Craig I., et al., "User's Guide to NIST Fingerprint Image Software 2 (NFIS2), National Institute of Standards and Technology, published on the Internet at http://fingerprint.nist.gov/NFIS, October 2004.

Also, it may be the case that imperfections in the pattern 103 exist. For example, where the pattern 103 comprises a fingerprint, it may be the case that part of the fingerprint is smudged or its appearance may be diminished in some other manner. In such case, various techniques may be applied to correct for imperfections in a given pattern 103. For example, techniques for the enhancement of fingerprints are discussed by Maltoni, Davide, et al., "Handbook of Fingerprint Recognition," Springer Science+Business Media, Inc., New York, 2003. See also Watson, Craig I., et al., "User's Guide to NIST Fingerprint Image Software 2 (NFIS2), National Institute of Standards and Technology, published on the Internet at http://fingerprint.nist.gov/NFIS, October 2004.

Figure 2:
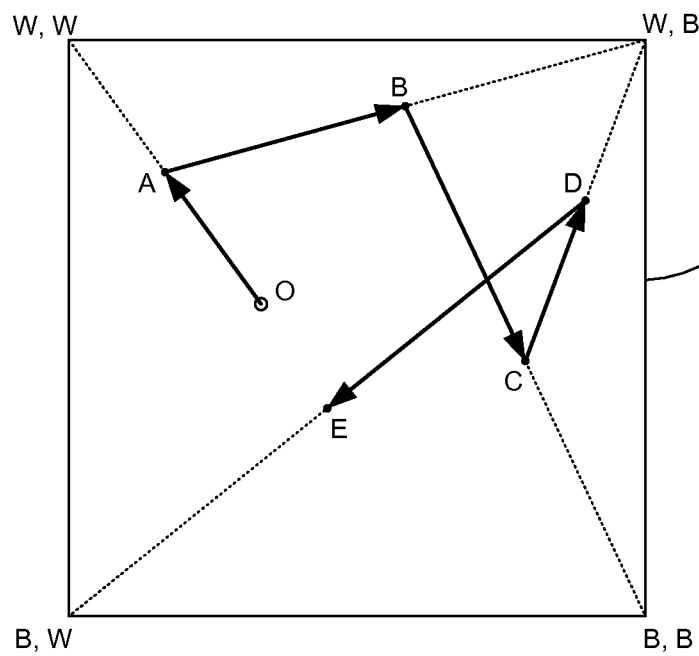
FIG. 2 is a drawing of a chaos game played based upon data obtained from the random walk of FIG. 1 according to an embodiment of the present invention.

With reference to FIG. 2, shown is one example of an undertaking of a chaos game according to an embodiment of the present invention. The chaos game involves plotting points A, B, C, D, and E within a square 136 that acts as the "chaos board." By plotting the points A, B, C, D, and E in the square, a fractal is created. The sets of data values obtained from pattern 103 (FIG. 1) and stored in the array are used to plot the points A, B, C, D, and E on the square of the chaos game. Each corner of the chaos board is labeled with one of the possible combinations of data values from the random walk 106 (FIG. 1). For example, in the context of a fingerprint, the corners of the chaos board may be labeled white-white, white-black, black-white, and black-black.

In order to plot the points A, B, C, D, and E, first an origin O is randomly specified somewhere in the square 136. Then, starting at the origin O, according to one embodiment, the first point A is plotted by moving one half the distance between the origin O and the corner specified by the data values associated with the first point 113 in the array of data values generated by the random walk 106. In other embodiments, one might move at some fraction of the distance other than one half the distance between the origin O and the corner specified.

For example, assuming that the first set of data value is white-white, then point A is plotted at the half point between the origin O and the corner labeled W, W. The next set of data values is then accessed and the process is repeated beginning at the last point plotted. For example, assuming that the next set of data values is white-black, then the next point B is plotted at the half point on the segment between the point A and the corner labeled W, B as shown. Assuming that the third set of data values is black-black as shown, then third point is plotted at the half point between point B and the corner B, B, and so on. The chaos game involves repeating this process with all of the sets of data values (or other types of values) until the sets of data values generated by the random walk 106 have been exhausted. Given that the number of data values is rather large, in one embodiment, the chaos game is implemented using a computer system as will be described. As described above, according to other embodiments, the chaos game may be played using other fractions of the distances other than the half point between the respective points and the identified corners.

Figure 3:
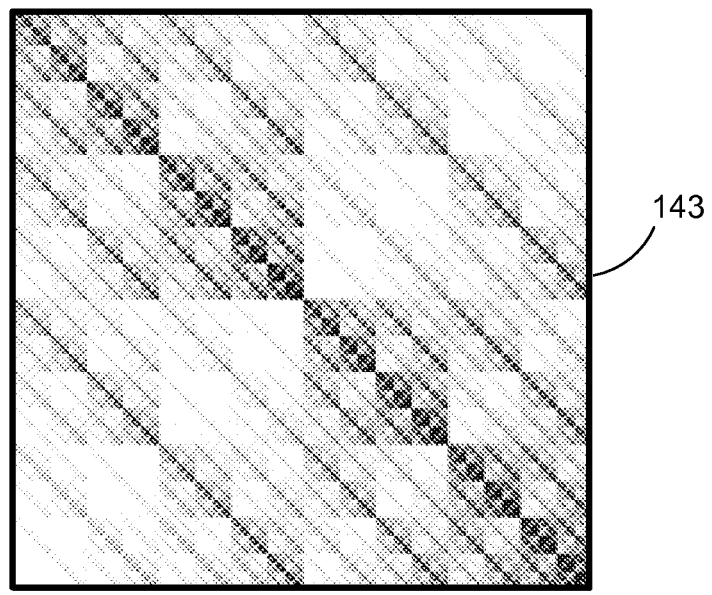
FIG. 3 is a picture of one example of a fractal generated by playing a chaos game as shown, for example, in FIG. 2 according to an embodiment of the present invention.

With reference to FIG. 3, shown is an example of a fractal 143 that results from the chaos game undertaken as discussed with reference to FIG. 2 using the data values generated from the random walk 106 as described with reference to FIG. 1 according to an embodiment of the present invention. As can be seen, the fractal 143 is a self-similar structure that is defined as an object that is exactly or approximately similar to a part of itself, i.e., the whole has the same shape as one or more of the parts. The parts of a fractal that are approximately similar to the entire fractal are organized in gradations. To explain further, the highest gradation comprises an image that encompasses the entire fractal 143. A second gradation of the fractal 143 involves four parts or subcomponents in the shape of squares that are approximately similar with respect to each other, and to the single image comprising the entire fractal at the highest gradation.

One property of fractals is that the self-similar pattern is repeated on a smaller scale at each new lower gradation. If the number of points in the fractal were infinite, then the self-similar pattern would be repeated at a smaller scale to infinity. However, given that the number of points in the random walk 106 is finite, then the self-similarity of the patterns repeated at each successive gradation will be diminished accordingly.

Figure 4:
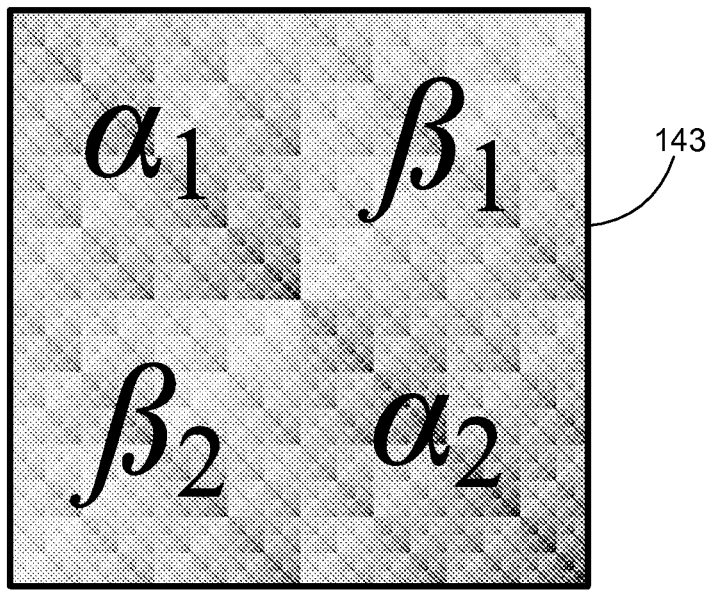
FIG. 4 is a drawing of a fractal generated in a manner similar to the fractal of FIG. 3 illustrating scaling parameters associated with repeated patterns in a given gradation of the fractal according to an embodiment of the present invention.

Turning then to FIG. 4, shown is an illustration of scaling parameters associated with a given fractal 143 generated as described above with respect to FIGS. 1 and 2. In the second gradation of the fractal 143, there are four self-similar patterns. The patterns are labeled with scaling parameters $\alpha_1$, $\beta_1$, $\alpha_2$, and $\beta_2$. The scaling parameters $\alpha_1$, $\beta_1$, $\alpha_2$, and $\beta_2$ each express a ratio of a number of points in a repeated, self-similar pattern in a gradation relative to the total number of points in the entire fractal 143. Thus, in the example fractal 143 of FIG. 4, the scaling parameter $\alpha_1$, expresses the ratio of points in the upper left hand quadrant of the fractal 143 relative to the total number of points plotted in the entire fractal 143.

The values of the scaling parameters $\alpha_1$, $\beta_1$, $\alpha_2$, and $\beta_2$ each comprise a quantity that is unique to the fractal 143. The scaling parameters $\alpha_1$, $\beta_1$, $\alpha_2$, and $\beta_2$ may be employed as a quantitative characterization of the pattern 103 from which the fractal 143 was generated. This quantitative characterizations that are generated in this manner are global as opposed to local in nature in the sense that they relate to the entire pattern 103. That is to say, the quantitative characterizations generated as described above relate to the entire pattern 103 and not to specific portions or characteristics of the pattern 103. To provide an example, the fractal analysis described herein involves generating data values 116 associated with hundreds of thousands, if not millions of points 113 taken from the pattern 103 in its entirety. This contrasts with traditional "local" analysis of fingerprints that focuses on identifying and measuring specific distances between minutia in the pattern 103.

The global approach is applied to the entire pattern 103 or any designated portion of the pattern 103 that is identified for analysis. In this sense, the analysis set forth herein is "global" to whatever portion of the pattern 103 that is analyzed. The fact that the quantitative characterizations are generated using a global approach via the fractal analysis described herein allows probabilities to be assigned to matches between any two quantitative characterizations. This provides a distinct advantage, for example, in determining matches between two patterns 103 such as fingerprints or other patterns 103.

The scaling parameters $\alpha_1$, $\beta_1$, $\alpha_2$, and $\beta_2$ will vary depending upon the scale $\lambda$ specified for the random walk 106 that was undertaken to generate the respective fractal 143. Thus, one may generate multiple fractals 143, each generated at a different scale $\lambda$ and the resulting values of the scaling parameters $\alpha_1$, $\beta_1$, $\alpha_2$, and $\beta_2$ can be plotted in respective curves as a function of the scale $\lambda$.

Figure 5:
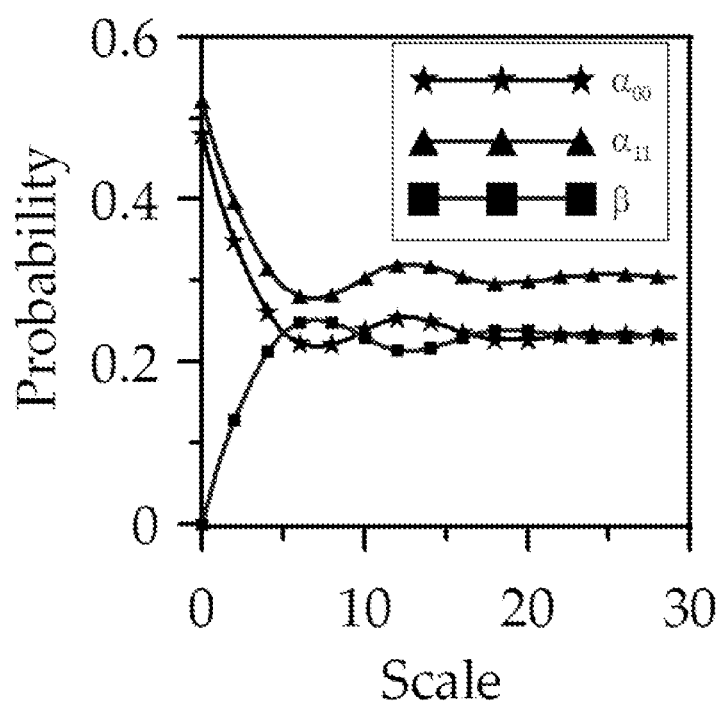
FIG. 5 is a graph of the scaling parameters of FIG. 3 for multiple different scales for a given pattern, where the scaling parameters are generated from multiple fractals generated at different scales according to an embodiment of the present invention.

For instance, referring to FIG. 5, shown is one example of a graph that depicts the scaling parameters $\alpha_1$, $\beta_1$, $\alpha_2$, and $\beta_2$ as a function of the scale $\lambda$ according to an embodiment of the present invention. The graph depicts the scaling parameters $\alpha_1$, $\beta_1$, $\alpha_2$, and $\beta_2$ for a typical fingerprint as a function of the scale $\lambda$. The characteristics of the curves representing the scaling parameters $\alpha_1$, $\beta_1$, $\alpha_2$, and $\beta_2$ as a function of the scale $\lambda$ depend upon the nature of the pattern 103. For example, where the pattern 103 is a fingerprint, the pattern 103 includes many wavy, repeated lines. As seen in the graph of FIG. 5, the repetitive nature of such a pattern is revealed in the form of ringing in what appears to be a typical underdamped response.

In other examples, the pattern 103 may comprise noise as opposed to an organized structure as is the case, for example, with fingerprints. According to various embodiments, as a pattern 103 approaches pure noise, the magnitudes of the scaling parameters $\alpha_1$, $\beta_1$, $\alpha_2$, and $\beta_2$ become equal (i.e. they all approach 0.25). In such case, the resulting fractal 143 would appear to be uniformly gray across the entire area. This provides a beneficial approach to detect the degree of organization that exists in a given pattern, or the degree to which a pattern 103 is actually a signal or noise. For example, a pattern 103 may comprise a recording of a transmitted signal in which a message is hidden. The signal may be recorded in digital form comprising digital samples of a corresponding analog signal. A random walk 106 may be performed through the digital samples in order to generate the data values from which a fractal 143 may be constructed.

The degree to which the scaling parameters $\alpha_1$, $\beta_1$, $\alpha_2$, and $\beta_2$ of the self-similar portions of the resulting fractal 143 are equal to each other corresponds to the probability that the pattern in the signal comprises noise as opposed to an organized message. Thus, the degree of equality among the scaling parameters $\alpha_1$, $\beta_1$, $\alpha_2$, and/or $\beta_2$ of the fractal 143 also corresponds to the probability that the pattern in the signal comprises noise as opposed to an organized message. In the case of a fractal constructed from a pattern 103 comprising pure noise, the scaling parameters $\alpha_1$, $\beta_1$, $\alpha_2$, and $\beta_2$ will each equal approximately 0.25 at every scale, resulting in a substantially straight line. Thus, according an embodiment of the present invention, fractals 143 of various patterns embodied in signals may be generated to detect whether a message that makes up an organized pattern exists in the signals themselves as will be described.

In view of the foregoing discussion, according to various embodiments, the fractals 143 may be generated from, or fractal analysis performed on patterns 103 that may comprise any image. For example, the image may comprise a fingerprint or any other image. In another embodiment, the pattern 103 is associated with a biological feature of living organism. Such biological features may comprise, for example, a fingerprint, an image of a face of a human being, an image of an ear, an image of an iris or retina, an image of blood vessels in a cornea, DNA of any living organism, or any other biological feature of a living organism. Still further, the pattern 103 may exist in data generated by a data process. Such data might include financial transactions and the like.

The pattern 103 may also be derived from voice prints (i.e. recorded voice signals), bite prints, dental records, or an image of a sample of currency.

In any event, regardless of the specific nature of the pattern 103, a random walk 106 is performed by asking a question that has four possible answers (assuming the fractal is to be generated in the form of a square). For example, for random walk 106 through a black and white image, one would ask whether the pixels identified as the data points 113 are white-white, white-black, black-white, or black-black as described above. This random walk 106 may be modified. For example, instead of choosing a random point and a random angle with a fixed distance (scale), one might choose a random point, a random distance, and a fixed angle. In addition, if the fractal is generated in forms other than a square, the number of answers associated with each step of the random walk accords with the number of corners of the shape of the fractal.

For different data, one might ask a different question. For example, a random walk may be performed by asking specific questions that have specific answers such as might be the case in polling voters, etc. Still further, other random walks 106 might naturally provide the data points 113 such as in the case with DNA. In such an example, DNA involves a very large sequence made out of four amino acids. One might perform the random walk through the sequence, where each corner in corresponding chaos game is associated with a given one of the amino acids. In addition, there are many other ways of performing a random walk in order to generate data points 113 from which a fractal can be generated.

Whether the quantitative characterization associated with a fractal 143 comprises one or more discrete values of the scaling parameters $\alpha_1$, $\beta_1$, $\alpha_2$, and $\beta_2$, as depicted in FIG. 5, or a curve or other graphing of the values of scaling parameters $\alpha_1$, $\beta_1$, $\alpha_2$, and $\beta_2$ as a function of scale as depicted in FIG. 5, a common characteristic of the quantitative characteristics is that the original pattern 103 cannot be reconstructed from or "backed out of" the quantitative characteristics. This provides a significant advantage in that a quantitative characteristic can be generated for a given pattern 103 that can be provided to third parties by a given individual or organization without compromising the pattern 103 itself. This fact makes the quantitative characterizations quite effective for such uses as authentication and the like where identity can be verified without compromising the actual biological pattern such as a fingerprint.

Figure 6:
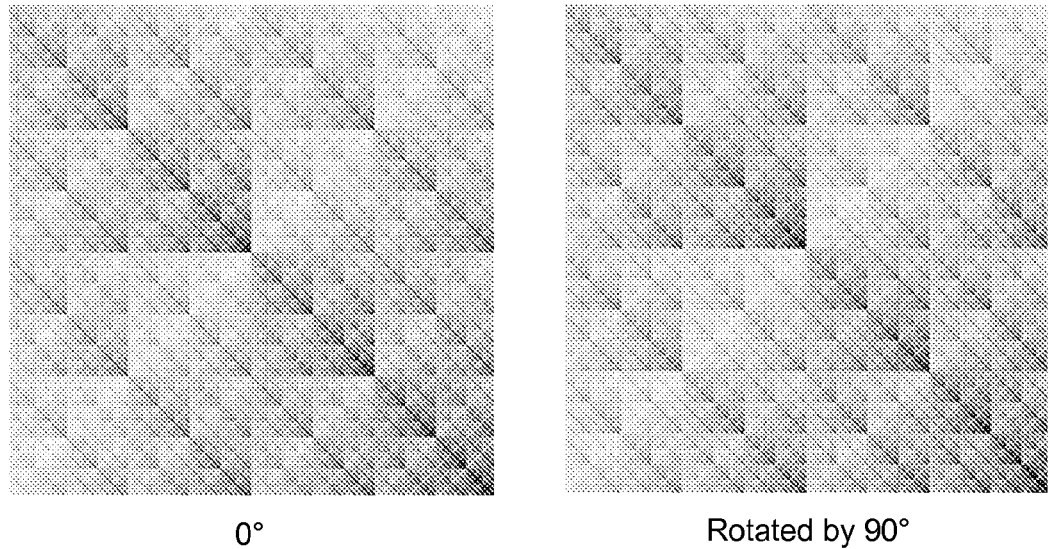
FIG. 6 is a drawing of two fractals generated from the same image, where the image was rotated by 90 degrees before generation of the second fractal according to an embodiment of the present invention.

With reference to FIG. 6, shown are two fractals generated from the same pattern according to an embodiment of the present invention. The fractals shown illustrate an advantage to the use of fractal analysis as set forth above to generate a quantitative characteristic of a pattern 103. Specifically, the same fractal results regardless of the orientation of the pattern 103 with respect to the random walk 106 performed. In the illustration shown in FIG. 6, both fractals were generated from a random walk 106 through the same pattern 103 comprising the same fingerprint. However, when the corresponding random walks 106 were performed, the pattern 103 resulting in the fractal on the right was rotated by 90 degrees with respect to the fractal on the left. Thus, a fractal may be generated from which a quantitative characterization may be derived for a respective pattern regardless of the orientation of the pattern 103 itself. This follows from the fact that the random walk 106 is, in fact, random. Hence, the orientation of the pattern 103 when performing the random walk 106 does not matter.

This provides a significant advantage, for example, in the field of fingerprint analysis as the orientation of the fingerprints will not bear on the matching process for the purposes of individual identification.

Still further, it is also the characteristic of fractal analysis that the fractals of patterns 103 can be generated from a portion of the entire pattern 103. Specifically, a fractal generated from, for example, a portion of a pattern such as a fingerprint will be substantially similar to a fractal generated from the entire fingerprint. As a general rule, the portion of the pattern 103 should be at least approximately 25% of the entire pattern 103 in order to result in substantially the same fractal. Consequently, a quantitative characterization associated with a portion of a pattern 103 will be substantially similar to the quantitative characterization associated with the entire pattern 103. This property of fractal analysis is particularly useful, for example, where only partial fingerprints of a suspect are available at a crime scene, making identification of culprits to a crime possible where previous fingerprint identification would not be possible.

Figure 7:
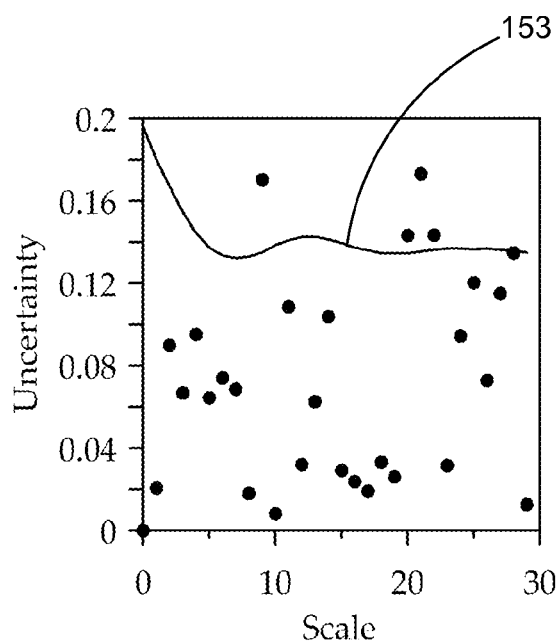
FIG. 7 is a graph that plots an theoretical uncertainty with respect to the generation of fractal images according to an embodiment of the present invention.

Turning then to FIG. 7, show is a graph that depicts an uncertainty factor of fractals generated with finite numbers of points 113 according to an embodiment of the present invention. As shown, the graph of FIG. 7 depicts the difference in a given scaling parameter for two fractals that were rotated 90 degrees with respect to each other when random walks 106 were performed. Specifically, at each scale, a fractal was generated for the pattern 103 and its rotated version. At each scale, one of the scaling parameters $\alpha_1$, $\beta_1$, $\alpha_2$, and $\beta_2$ was generated for each of the two fractals generated. The scaling parameters generated were subtracted, thereby generating a difference that indicates the degree of uncertainty in the sequential generation of the same scaling parameters for the same pattern 103, where the pattern 103 is rotated in the second instance relative to the first instance. Alternatively, the same graph might be generated for the same pattern 103 using two different random walks 106.

The graph also includes a curve 153 that indicates a theoretical uncertainty as a function of scale $\lambda$. The theoretical uncertainty is generated using the equation:

$$\text{error} = \frac{1}{\sqrt{n}},$$

where n is equal to the number of random steps in the respective random walk 106.

As can be seen in the graph of FIG. 7, most of the actual differences calculated with respect to a given scaling parameter from two separate fractals fall under the theoretical curve 153 of uncertainty.

Figure 8:
FIG. 8 is a picture of two patterns in the form of images that differ in appearance to illustrate an ability to determine whether a match exists therebetween based upon a quantitative characterization of each of the images according to an embodiment of the present invention.
Figure 9:
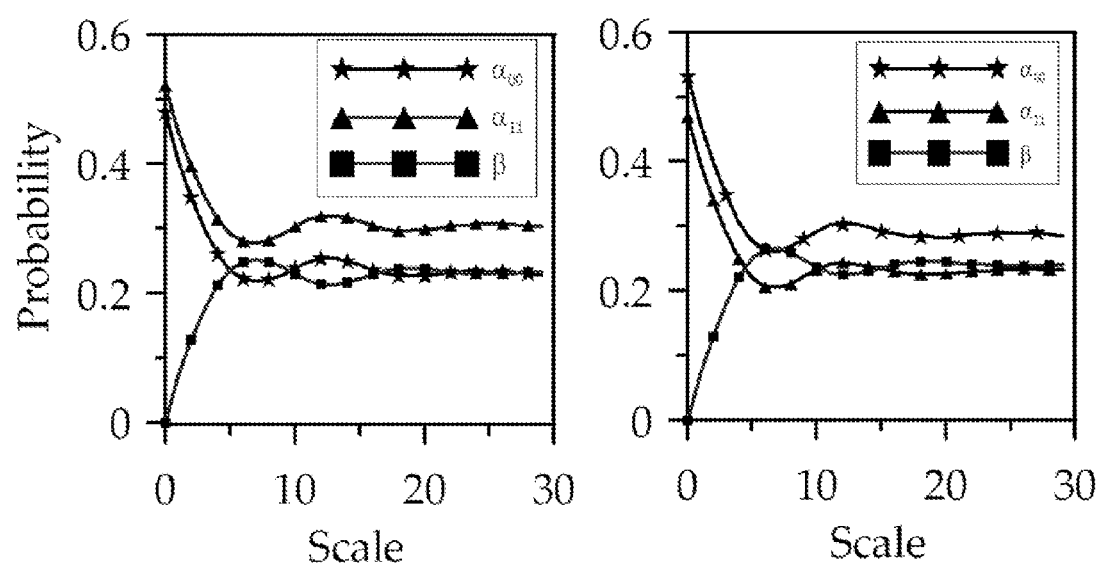
FIG. 9 is a side to side comparison of charts illustrating quantitative characterizations generated from the corresponding images of FIG. 8 according to an embodiment of the present invention.

FIGS. 8 and 9 provide a practical illustration of the resulting quantitative characterizations generated for two different, but somewhat similar patterns 103 that comprise fingerprints from different individuals. The graphs of the scaling parameters $\alpha_1$, $\beta_1$, $\alpha_2$, and $\beta_2$ as a function of scale $\lambda$ depicted in FIG. 9 were generated for the corresponding fingerprints depicted in FIG. 8. As shown, there are significant differences in the curves of the different graphs of FIG. 9, even though the fingerprints are somewhat similar in appearance. Thus, it is much easier to see a difference in the quantitative characterization of the patterns 103 comprising the fingerprints that it is to examine the actual fingerprints.

Figure 10:
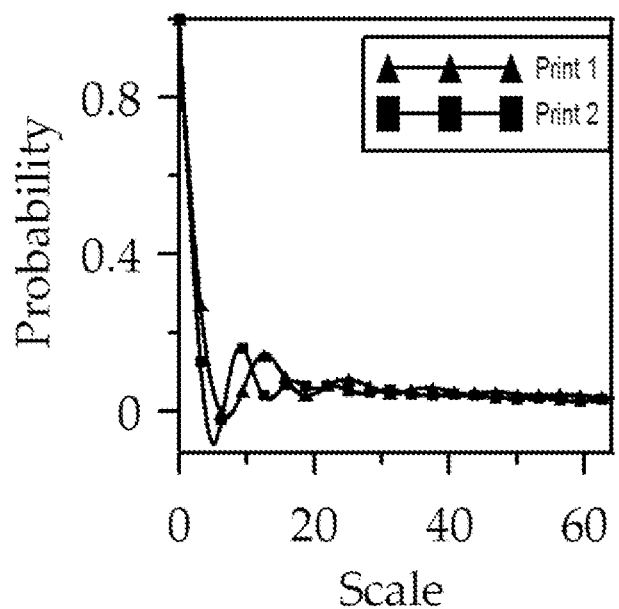
FIG. 10 is a drawing of a graph that illustrates quantitative characterizations generated from the respective images of FIG. 8 according to an embodiment of the present invention.

Turning to FIG. 10, shown is an additional graph that depicts a further quantitative characterization of the patterns of FIG. 8 based upon the curves depicted in FIG. 9. Specifically, FIG. 10 shows two curves, each curve corresponding to one of the two fingerprints of FIG. 8 and correlating to a respective one of the graphs of FIG. 9. Each of the curves of FIG. 10 is generated based upon a mathematical calculation involving all of the scaling parameters depicted in a respective one of the graphs of FIG. 8. In particular, each curve depicted in FIG. 10 is calculated as follows:

$$\Sigma(\sigma) = 1 - \frac{\beta^2(\sigma)}{\alpha_1(\sigma)\alpha_2(\sigma)}.$$

The above calculation provides a normalized representation of each of the quantitative characterizations. The scale spectrum $\Sigma(\sigma)$ as defined in the equation above has been normalized so that the initial value at $\sigma=0$ is equal to one (i.e. $\Sigma(0)=1$). Thus, for $\sigma=\infty$, the value is equal to zero (i.e. $\Sigma(\infty)=0$).

Figure 11:
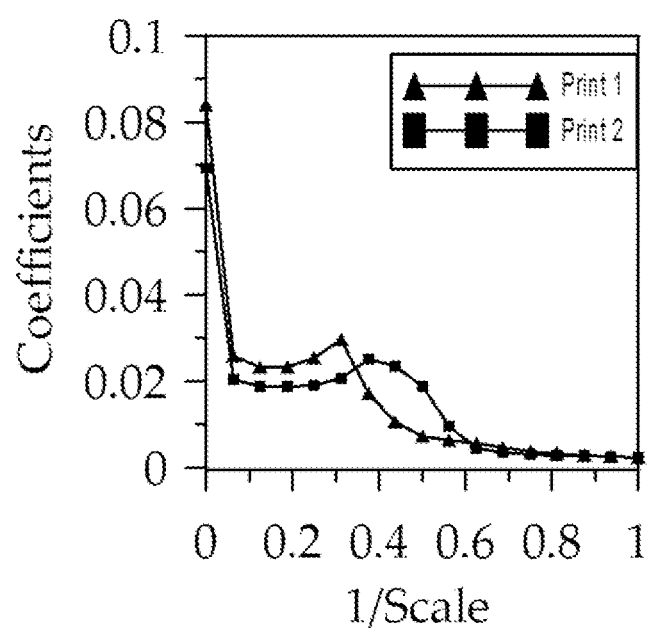
FIG. 11 is a graph that depicts an application of post processing to the quantitative characterizations of FIG. 10 according to an embodiment of the present invention.

With reference to FIG. 11, once the quantitative characterizations have been performed, it is possible that various post processing may be applied thereto to vary the form of the quantitative characterization in order for easier comprehension and to more effective illustrate differences and/or similarities between the quantitative characterizations of two patterns 103 according to an embodiment of the invention. For example, one form of post processing involves performing a Fourier analysis on one or more of the curves depicted in FIG. 9 or 10, thereby resulting in the curves depicted in FIG. 11. Recall, for example, that the scale spectrum of scaling parameters for fingerprints, for example, appears to present a curve reminiscent of an underdamped response. If follows that one or more peaks may appear in a Discrete Fourier Transform of such a curve. Other post processing approaches may involve fitting the scale spectrum to a polynomial, fitting the scale spectrum to a sum of Gaussian distributions, and other approaches.

Figure 12:
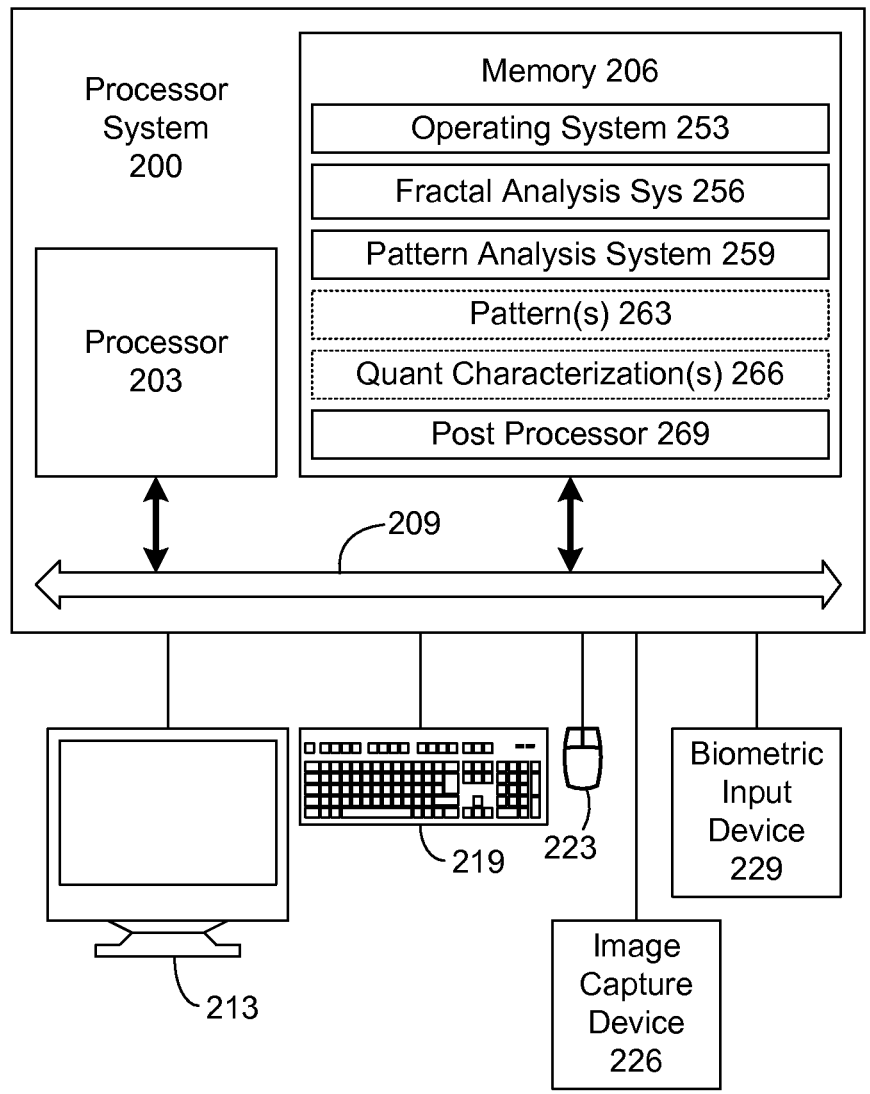
FIG. 12 is a schematic block diagram of one example of a system employed to generate quantitative characterizations of patterns and to perform various analysis with respect to the quantitative characterizations according to an embodiment of the present invention.

Referring next to FIG. 12, shown is one example of a system that performs various functions using fractal analysis according to the various embodiments as set forth above. As shown, a processor system 200 is provided that includes a processor 203 and a memory 206, both of which are coupled to a local interface 209. The local interface 209 may be, for example, a data bus with an accompanying control/address bus as can be appreciated by those with ordinary skill in the art. The processor system 200 may comprise, for example, a computer system such as a server, desktop computer, laptop, personal digital assistant, or other system with like capability.

Coupled to the processor system 200 are various peripheral devices such as, for example, a display device 213, a keyboard 219, and a mouse 223. In addition, other peripheral devices that allow for the capture of various patterns may be coupled to the processor system 200 such as, for example, an image capture device 226, or a bio-metric input device 229. The image capture device 226 may comprise, for example, a digital camera or other such device that generates images that comprise patterns to be analyzed as described above. Also, the bio-metric input device 229 may comprise, for example, a fingerprint input device, optical scanner, or other bio-metric device 229 as can be appreciated.

Stored in the memory 206 and executed by the processor 203 are various components that provide various functionality according to the various embodiments of the present invention. In the example embodiment shown, stored in the memory 206 is an operating system 253, a fractal analysis system 256, and a pattern analysis system 259. In addition, stored in the memory 206 are various patterns 263 and various quantitative characterizations 266. The quantitative characterizations 266 may be associated with corresponding ones of the patterns 263, or the patterns 263 and quantitative characterizations 266 may be entirely independent of each other. The patterns 263 and the quantitative characterizations 266 may be stored in a database to be accessed by the other systems as needed. The patterns 263 may comprise fingerprints such as the pattern 103 (FIG. 1) or other patterns as can be appreciated. The patterns 263 comprise, for example, a digital representation of physical patterns or digital information such as data, etc.

The fractal analysis system 256 is executed by the processor 203 in order to generate a quantitative characterization 266 of a pattern 263 as described above. The quantitative characterization 266 generated is a global quantitative characterization of the respective pattern 263. To generate the quantitative characterization 266, the fractal analysis system 256 performs fractal analysis on the pattern 263 as will be described. The post processor 279 may be an optional component that may or may not be executed to further condition the quantitative characterization 266 generated by the fractal analysis system 256 as will be described. The quantitative characterizations 266 generated may comprise individual values or a curve associated with a scale spectrum as described above. In addition, the fractal analysis system 256 may include other functionality not discussed herein.

A number of software components are stored in the memory 206 and are executable by the processor 203. In this respect, the term "executable" means a program file that is in a form that can ultimately be run by the processor 203. Examples of executable programs may be, for example, a compiled program that can be translated into machine code in a format that can be loaded into a random access portion of the memory 206 and run by the processor 203, or source code that may be expressed in proper format such as object code that is capable of being loaded into a of random access portion of the memory 206 and executed by the processor 203, etc. An executable program may be stored in any portion or component of the memory 206 including, for example, random access memory, read-only memory, a hard drive, compact disk (CD), floppy disk, or other memory components.

The memory 206 is defined herein as both volatile and nonvolatile memory and data storage components. Volatile components are those that do not retain data values upon loss of power. Nonvolatile components are those that retain data upon a loss of power. Thus, the memory 206 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The processor 203 may represent multiple processors and the memory 206 may represent multiple memories that operate in parallel. In such a case, the local interface 209 may be an appropriate network that facilitates communication between any two of the multiple processors, between any processor and any one of the memories, or between any two of the memories etc. The processor 203 may be of electrical, optical, or molecular construction, or of some other construction as can be appreciated by those with ordinary skill in the art.

The operating system 253 is executed to control the allocation and usage of hardware resources such as the memory, processing time and peripheral devices in the processor system 200. In this manner, the operating system 253 serves as the foundation on which applications depend as is generally known by those with ordinary skill in the art.

The following discussion relates to flow charts describe various examples of functionality of the various systems as set forth above. For each flow chart, the functionality may implemented, for example, using an object oriented design. If such is the case, then each block may be considered as representing functionality that may be implemented in one or more methods that are encapsulated in one or more objects. The various functionality depicted in the flow charts described herein may be implemented using any one of a number of programming languages such as, for example, C, C++, JAVA, Perl, Python, Flash, or other programming languages.

Figure 13:
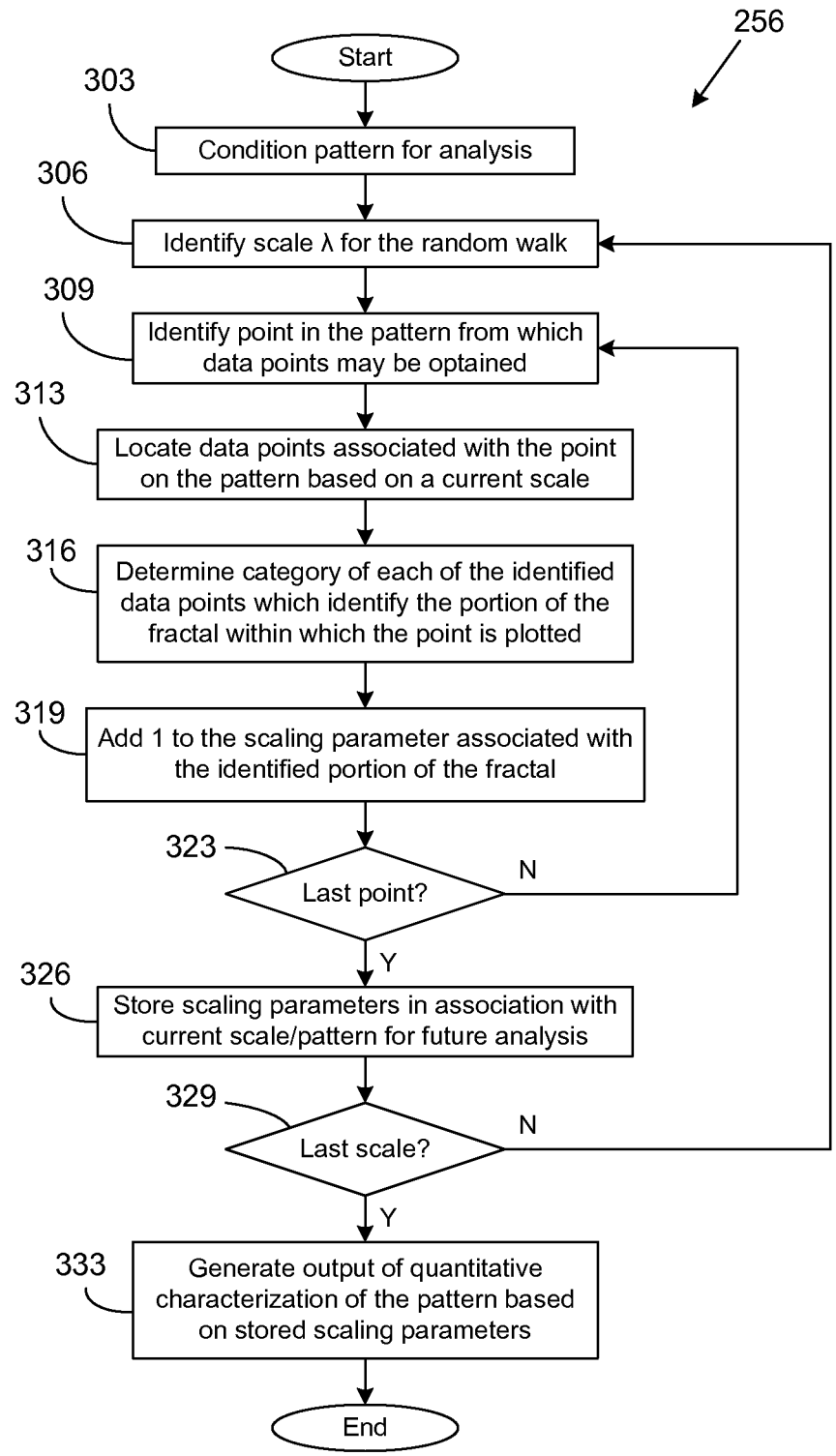
FIG. 13 is a flow chart of one example of the operation of a fractal analysis system executed in the system of FIG. 12 to generate a quantitative characterization of a pattern according to an embodiment of the present invention.

Referring next to FIG. 13, shown is a flow chart that provides one example of the operation of the fractal analysis system 256 to perform a fractal analysis of a pattern in order to generate a quantitative characterization of the pattern according to an embodiment of the present invention. Alternatively, the flow chart of FIG. 13 may be viewed as depicting steps of an example of a method implemented in the processor system 200 to perform fractal analysis of a pattern to generate a quantitative characterization of the pattern according to another embodiment of the present invention.

To begin, at box 303, the fractal analysis system 256 performs any preconditioning operations with respect to the pattern 103 for which one or more fractals 143 (FIG. 3) are to be generated. For example, the fractal analysis system 256 may eliminate gray or other intermediate colors from the pattern 103, or may condition the pattern in some other matter to facilitate a random walk as was described above. For instance, the fractal analysis system 256 may be configured to impose a border around at least a region of the pattern 103 within which the random walk is to be performed. Thereafter, in box 306, the fractal analysis system 256 identifies a scale λ for the random walk 106 to be performed through the respective pattern 103 preconditioned in box 303. Note that it may be possible that the pattern 103 does not need preconditioning and box 303 might be skipped.

Once the scale λ is identified in box 306, then in box 309, a random point is identified in the pattern 103 from which data points may be obtained. The fractal analysis system 256 might generate random X and Y coordinates or other coordinates that locate a random point in the pattern 103 in a manner so as to accord with the discussion of a random walk set forth above. Once a point is identified in box 309, then in box 313 the data points 116 (FIG. 1) associated with the identified point 113 (FIG. 1) in box 309 are located on the pattern 103 based upon the current scale λ. In one embodiment as described above, such may be accomplished by generating a random angle and imposing a segment 119 (FIG. 1) over the point 113, where the point 113 identified in box 309 bisects the segment 119 of length 2 λ. The data points 116 would thus be at either end of the segment as described above. In addition, there are other approaches to locate the data points 116 associated with a given point 113 of a random walk as described above. For example, where the pattern comprises DNA or a series of recorded data transactions, the generation of the data values 116 may be performed in an entirely different manner as described above.

Next, in box 316, a category is associated with the identified data points 116. For example, in the context of a fingerprint as described above, the categories may be "black" or "white" depending on the color of the pixels upon which the data points 116 fall as described above. The category determined for each of the data points 116 ultimately identifies which portion of a resulting fractal within which a point would be plotted where a fractal to be constructed. As it happens, in the chaos game illustrated with reference to FIG. 2, the point plotted in the resulting fractal is always plotted in the respective quadrant or portion of the fractal corresponding to the corner that, in turn corresponds to the categories (such as WW, WB, BW, or BB) determined for the data points. If the nature of the random walk 106 is such that this does not occur, then an additional function block should be added in which the placement of a point in a given fractal is determined so that the portion of the fractal within which the point falls can be determined. Ultimately, in box 316, the portion of the fractal within which the plotted point would fall is determined.

Next, in box 319, a respective one of the scaling parameters $\alpha_1, \beta_1, \alpha_2$, or $\beta_2$ corresponding to the portion within which the point falls is incremented by 1. In this sense, the scaling parameters $\alpha_1, \beta_1, \alpha_2$, or $\beta_2$ that are associated with a fractal generated from the pattern 103 are generated without actually generating the fractal itself. Alternatively, the flow chart of FIG. 13 may be altered so as to generate the fractal and then determine the scaling parameters $\alpha_1, \beta_1, \alpha_2$, and $\beta_2$ therefrom.

Then, in box 323 it is determined whether a respective one of the scaling parameters $\alpha_1, \beta_1, \alpha_2$, or $\beta_2$ have been incremented for the last point of the fractal based upon the random walk 106. If not, then the fractal analysis system 256 reverts back to box 309 to identify the next point in the random walk 106 that is being performed with respect to the pattern 103. Otherwise, if the last desired point has been considered in box 323, then the fractal analysis system 256 proceeds to box 326. The actual number of points generated in the random walk 106 that result in the incrementing of the scaling parameters $\alpha_1, \beta_1, \alpha_2$, or $\beta_2$ may vary and is application specific. Although the number of points may be any number appropriate for the application, in suggested embodiments, for example, the number of points in the random walk 106 may comprise a half million, a million, or more. The relatively large number of points taken speaks to the global nature of the quantitative characterization of the pattern 103. That is to say, where the scaling parameters $\alpha_1, \beta_1, \alpha_2$, or $\beta_2$ comprise a quantitative characterization, or comprise a part of a curve that is taken as a quantitative characterization of a pattern 103, they are generated by a random walk 106 that covers the entire area or scope of the pattern 103 characterized as described above.

In box 326, the scaling parameters $\alpha_1$, $\beta_1$, $\alpha_2$, or $\beta_2$ are stored in a memory in association with a current scale $\lambda$ and pattern 103 for which the fractal analysis is being performed. Thereafter, the fractal analysis system 256 proceeds to box 329 to determine whether the scaling parameters $\alpha_1$, $\beta_1$, $\alpha_2$, or $\beta_2$ for a different scale are to be determined. For example, in some situations, it is desirable to generate many sets of scaling parameters $\alpha_1$, $\beta_1$, $\alpha_2$, or $\beta_2$ at different scales $\lambda$ so that a quantitative characterization 266 (FIG. 12) comprising a scale spectrum may be generated to plot the curves representing the scaling parameters $\alpha_1$, $\beta_1$, $\alpha_2$, and $\beta_2$ as described above. Alternatively, it may be desirable to generate one or more of the scaling parameters $\alpha_1$, $\beta_1$, $\alpha_2$, and/or $\beta_2$ at discrete scales $\lambda$.

Alternatively, the fractal analysis system 256 may have been executed only to generate a single set of scaling parameters $\alpha_1$, $\beta_1$, $\alpha_2$, and $\beta_2$ in cases where the quantitative characterizations 266 to be obtained comprise a single value as described above. Assuming that the last set of scaling parameters $\alpha_1$, $\beta_1$, $\alpha_2$, and $\beta_2$ at the current scale has been generated in box 329, then the fractal analysis system 256 proceeds to box 333. Otherwise, the fractal analysis system 256 reverts back to box 306 to identify the scale $\lambda$ for the next random walk 106 to be preformed through the given pattern 103.

In box 333, the fractal analysis system 256 generates an output of the quantitative characterization of the pattern 103 comprising the single or multiple sets of scaling parameters $\alpha_1$, $\beta_1$, $\alpha_2$, and $\beta_2$ stored in step 326. In this respect, the output may comprise a curve or a single set of scaling parameters $\alpha_1$, $\beta_1$, $\alpha_2$, or $\beta_2$ as was described above. Alternatively, rather than generating an output, the respective fractal analysis system 256 might provide the respective quantitative characterization of the pattern 103 to other applications such as one that determines whether the quantitative characterization matches another known quantitative characterization, etc.

Figure 14:
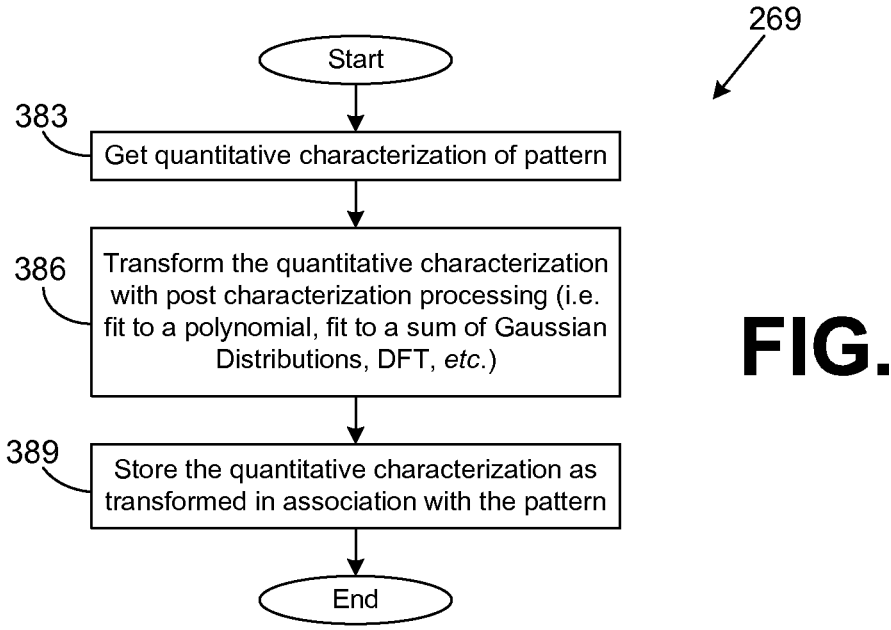
FIG. 14 is a flow chart of an example of the operation of the post processor of FIG. 12 that transforms a quantitative characterization of a fractal into a different form according to an embodiment of the present invention.

Referring next to FIG. 14, shown is a flow chart that provides one example of the operation of the post processor 279 according to an embodiment of the present invention. Alternatively, the flow chart of FIG. 14 may be viewed as depicting steps of an example of a method implemented in the processor system 200 to transform a quantitative characterization 266 of a given pattern 103 into a different form as set forth above.

Beginning with box 383, first the post processor 279 obtains the quantitative characterization of a respective pattern 103 (FIG. 1). Thereafter, in box 386, the post processor 279 transforms the quantitative characterization with post characterization processing. Such processing may comprise, for example, fitting the quantitative characterization to a polynomial, fitting the quantitative characterizations to a sum of Gaussian distributions, performing a discrete Fourier transform on the quantitative characterization, or performing some other post-characterization processing. Thereafter, in box 389, the post processor 276 stores the quantitative characterization as transformed in associated with the given pattern 103. Then, the post processor 279 ends as shown.

Figure 15:
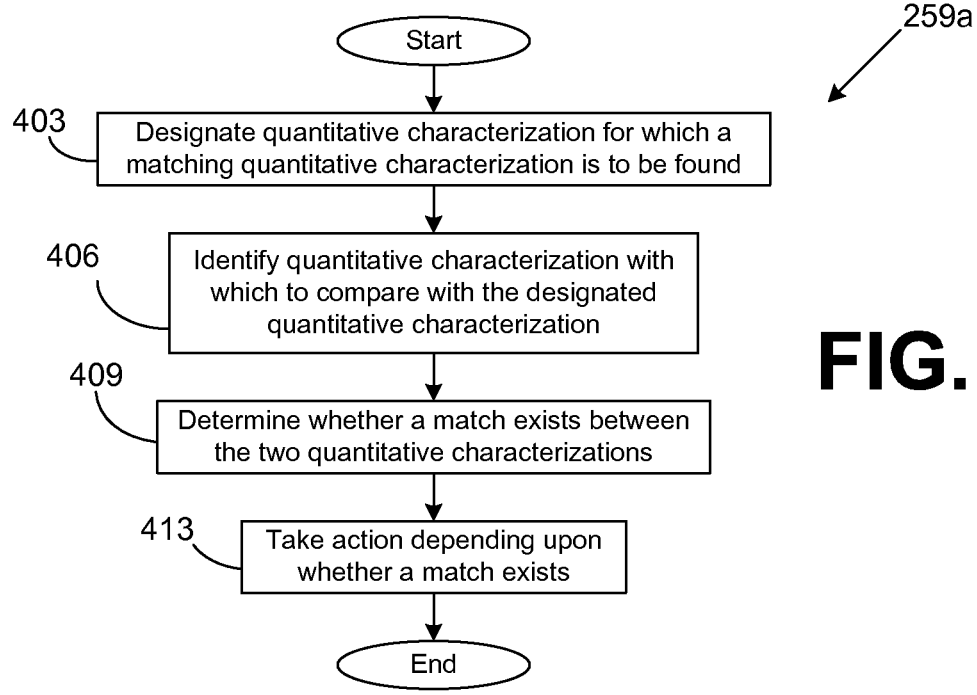
FIG. 15 is a flow chart of an example of the operation of a pattern analysis system of FIG. 12 according to an embodiment of the present invention.

Referring next to FIG. 15, shown is a flow chart that provides one example of the operation of the pattern analysis system 259, denoted herein as pattern analysis system 259a according to an embodiment of the present invention. Alternatively, the flow chart of FIG. 15 may be viewed as depicting steps of an example of a method implemented in the processor system 200 to analyze a match between patterns 103 based upon respective quantitative characterizations generated for such patterns 103 according to an embodiment of the present invention. For example, the pattern analysis system 259a may be employed to identify a perpetrator of a crime based upon fingerprint matching as can be appreciated.

Beginning with box 403, the pattern analysis 259a designates a particular quantitative characterization for which a matching quantitative characterization is to be found. Thereafter, the pattern analysis 259a proceeds to box 406 in which a second quantitative characterization which with to compare the designated quantitative characterization is identified.

Then in box 409, the pattern analysis system 259a determines whether a match exists between the two respective quantitative characterizations identified and designated in box 403 and 406. This may be done, for example, by determining whether the respective curves or other quantitative characterization value fall are similar to each other within an acceptable tolerance. A match does not necessarily mean an exact match between the respective quantitative characterizations given the degree of uncertainty in generating fractals as described above. Rather, a match is found when the respective quantitative characterizations match each other within a give acceptable tolerance as can be appreciated.

Thereafter, in box 413, the pattern analysis system 259a takes whatever action is to be taken depending on whether a match is found in box 409. For example, the action taken may be to indicate that a match was found such as might be the case, for example, where the match is found between two fingerprints generated by the same individual, thereby identifying the individual as being the source of both fingerprints.

Alternatively, the action taken in box 413 may be to indicate that no match has been found between the respective patterns corresponding to the respective quantitative characterizations. Such may be desirable to know, for example, in a case where the respective patterns comprise a DNA sample of a virus taken at different times that are compared to identify whether no match exists, there by indicating that the virus has mutated over time as can be appreciated. In addition, there may be many other actions taken depending on whether a match exists as determined in box 409. Once the action is taken in box 413, the pattern analysis system 259a ends as shown.

Figure 16:
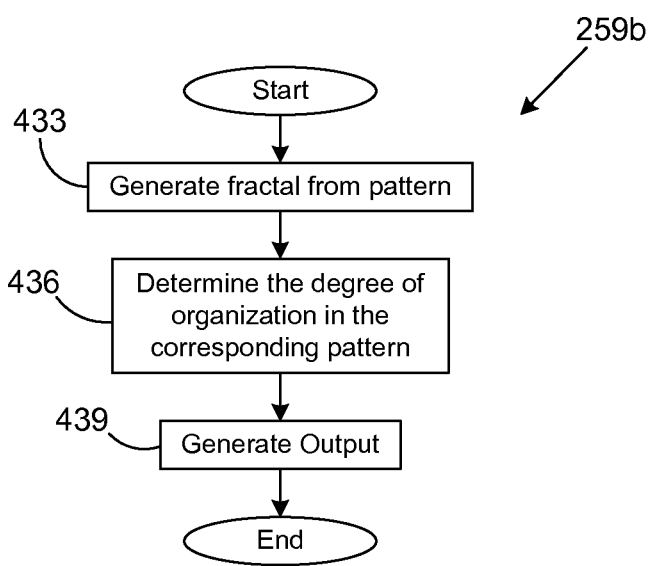
FIG. 16 is a flow chart of another example of the operation of a pattern analysis system of FIG. 12 according to an embodiment of the present invention.

Referring next to FIG. 16, shown is a flow chart that provides another example of the operation of the pattern analysis system 259, denoted herein as pattern analysis system 259b, according to an embodiment of the present invention. Alternatively, the flow chart of FIG. 16 may be viewed as depicting steps of an example of a method implemented in the processor system 200 to detect the degree of organization in a given pattern. For example, the pattern analysis system 259a and method might be implemented in order to detect messages encoded in noise signals and the like.

Beginning with box 433, the pattern analysis system 259b performs fractal analysis on a pattern 103 (FIG. 1) as described above. This may be done, for example, by executing the fractal analysis system 256 (FIG. 13) described above. Thereafter in box 436, the pattern analysis system 259b determines the degree of organization in the pattern by examining a degree of equality among the respective scaling parameters $\alpha_1$, $\beta_1$, $\alpha_2$, and/or $\beta_2$. Stated another way, the degree of organization in the pattern is determined by examining the degree two which the scaling parameters $\alpha_1$, $\beta_1$, $\beta_2$, and/or $\beta_2$ are equal to each other. To determine whether the scaling parameters $\alpha_1$, $\beta_1$, $\alpha_2$, and/or $\beta_2$ are substantially equal to each other, for example, the pattern analysis system 259b might be configured to compare a maximum difference between any two of the scaling parameters $\alpha_1$, $\beta_1$, $\alpha_2$, and/or $\beta_2$ with a predefined equality threshold. Alternatively, the degree of equality among the scaling parameters $\alpha_1$, $\beta_1$, $\alpha_2$, and/or $\beta_2$ may be determined in some other manner.

The extent to which the scaling parameters $\alpha_1$, $\beta_1$, $\alpha_2$, and/or $\beta_2$ are equal to each other indicates the extent to which the pattern comprises noise. As the pattern approaches pure noise, a fractal generated therefrom approaches a more uniform distribution of points and might appear, for example, uniformly gray. Conversely, the degree to which the scaling parameters $\alpha_1$, $\beta_1$, $\alpha_2$, and/or $\beta_2$ are not equal to each other indicates that some sort of organization exists in the pattern. This might also be determined by examining the degree to which the points are not uniformly plotted in a corresponding fractal. In the case where the pattern comprises a transmitted noise signal, for example, where the scaling parameters $\alpha_1$, $\beta_1$, $\alpha_2$, and/or $\beta_2$ do not equal each other, it is probable that an encoded covert signal exists in the noise.

Next, in box 439, the pattern analysis system 259b generates an output corresponding to the determination as to the degree of organization that exists in the pattern. The output might be a binary yes or no output, or some other output as can be appreciated, depending upon the application. Thereafter, the pattern analysis system 259b ends.

Although the fractal analysis system 256, pattern analysis systems 259, and/or the post processor 269 are described as being embodied in software or code executed by general purpose hardware as discussed above, as an alternative the same may also be embodied in dedicated hardware or a combination of software/general purpose hardware and dedicated hardware. If embodied in dedicated hardware, each of the fractal analysis system 256, pattern analysis systems 259, and/or the post processor 269 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 13-16 show the architecture, functionality, and operation of an implementation of the fractal analysis system 256, pattern analysis systems 259, and/or the post processor 269. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although flow charts of FIGS. 13-16 show a specific order of execution, it is understood that the order of execution may differ from that which is depicted. For example, the order of execution of two or more blocks may be scrambled relative to the order shown. Also, two or more blocks shown in succession in FIGS. 13-16 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where each of the fractal analysis system 256, pattern analysis systems 259, and/or the post processor 269 may comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the fractal analysis system 256, pattern analysis systems 259, and/or the post processor 269 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system, comprising:
   a processor circuit having a processor and a memory;
   a detection system stored in the memory and executable by the processor, the detection system comprising:
   logic that performs a fractal analysis on a first pattern to generate a first global quantitative characterization of the first pattern; and
   logic that compares the first global quantitative characterization with a second global quantitative characterization associated with a second pattern to determine whether the first pattern matches the second pattern, the second global quantitative characterization being generated from the second pattern, where the first pattern comprises a portion of the second pattern.

2. The system of claim 1, wherein the first and second patterns each comprise a biological feature of at least one living organism.

3. The system of claim 2, wherein the first pattern further comprises a first fingerprint and the second pattern comprises a second fingerprint.

4. The system of claim 2, wherein the first and second patterns each further comprise an image of a human face.

5. The system of claim 2, wherein the first pattern exists in a first set of data generated by a first data process and the second pattern exists in a second set of data generated by a second data process.

6. The system of claim 2, wherein the first pattern further comprises a first sample of DNA and the second pattern comprises a second sample of DNA.

7. The system of claim 1, wherein the first pattern comprises an image of a first sample of a currency and the second pattern comprises an image of a second sample of the currency.

8. The system of claim 1, wherein the first global quantitative characterization is generated from the first pattern at an orientation that differs from the orientation at which the second global quantitative characterization was generated from the second pattern.

9. A detection method, comprising the steps of:
performing a fractal analysis on a first pattern in a computer system to generate a first global quantitative characterization of the first pattern; and
comparing the first global quantitative characterization with a second global quantitative characterization associated with a second pattern in the computer system to determine whether the first pattern matches the second pattern, the second global quantitative characterization being generated from the second pattern, where the first pattern comprises a portion of the second pattern.

10. The detection method of claim 9, further comprising the step of capturing the first pattern using a capture device.

11. The detection method of claim 9, wherein the first and second patterns each comprise a biological feature of at least one living organism.

12. The detection method of claim 11, wherein the first pattern further comprises a first fingerprint and the second pattern comprises a second fingerprint.

13. The detection method of claim 11, wherein the first and second patterns each further comprise an image of a human face.

14. The detection method of claim 11, wherein the first pattern further comprises a first sample of DNA and the second pattern comprises a second sample of DNA.

15. The detection method of claim 9, wherein the first pattern exists in a first set of data generated by a first data process and the second pattern exists in a second set of data generated by a second data process.

16. The detection method of claim 9, wherein the first pattern comprises an image of a first sample of a currency and the second pattern comprises an image of a second sample of the currency.

17. The detection method of claim 9, wherein the first global quantitative characterization is generated from the first pattern at an orientation that differs from the orientation at which the second global quantitative characterization was generated from the second pattern.

18. A system, comprising:
means for a fractal analysis on a first pattern to generate a first global quantitative characterization of the first pattern; and
means for comparing the first global quantitative characterization with a second global quantitative characterization associated with a second pattern to determine whether the first pattern matches the second pattern, the second global quantitative characterization being generated from the second pattern, where the first pattern comprises a portion of the second pattern.

19. The system of claim 18, wherein the first and second patterns each comprise a biological feature of at least one living organism.

20. The system of claim 18, wherein the first pattern comprises an image of a first sample of a currency and the second pattern comprises an image of a second sample of the currency.

21. A non-transitory computer-readable medium embodying a program executable by a computer system, comprising:
code that performs a fractal analysis on a first pattern to generate a first global quantitative characterization of the first pattern; and
code that compares the first global quantitative characterization with a second global quantitative characterization associated with a second pattern to determine whether the first pattern matches the second pattern, the second global quantitative characterization being generated from the second pattern, where the first pattern comprises a portion of the second pattern.

22. The non-transitory computer-readable medium of claim 21, wherein the first and second patterns each comprise a biological feature of at least one living organism.

23. The non-transitory computer-readable medium of claim 21, wherein the first pattern comprises an image of a first sample of a currency and the second pattern comprises an image of a second sample of the currency.

* * * * *